Nov. 30, 1948.    J. S. WALLIS ET AL    2,455,201
FURNACE BAFFLE
Filed Jan. 3, 1944
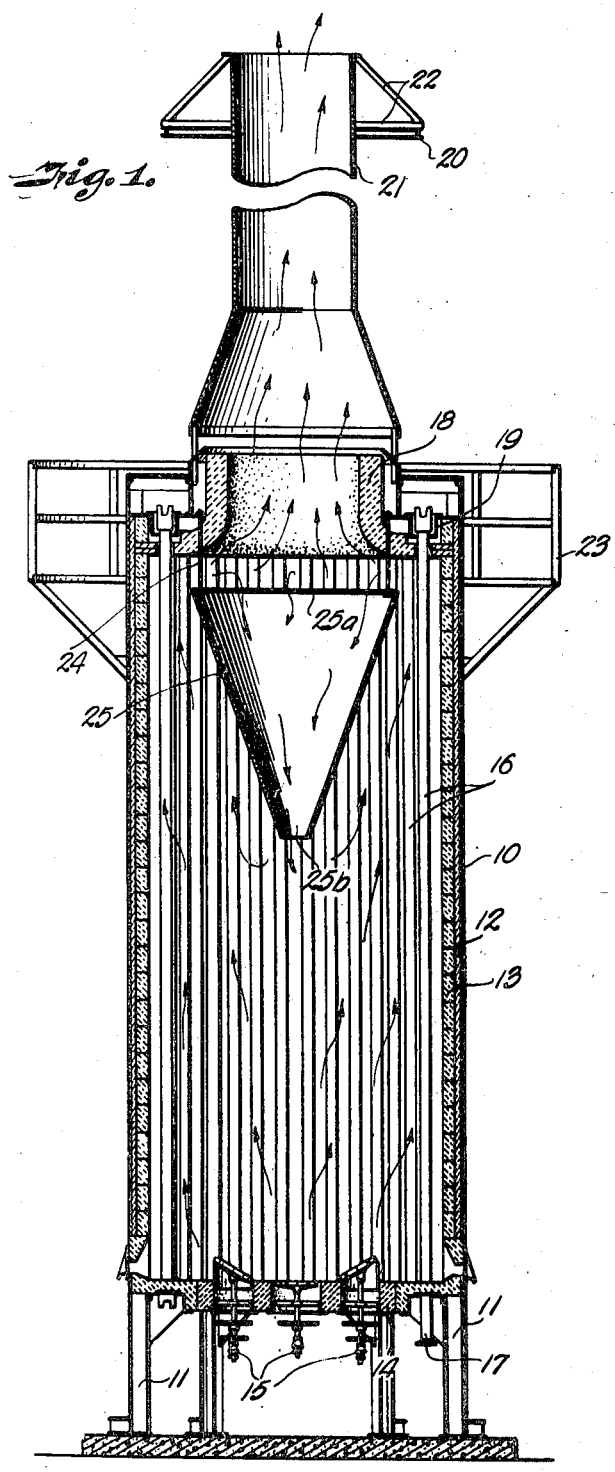
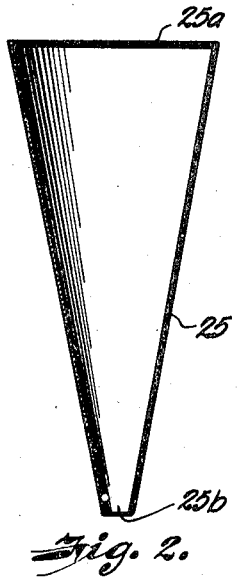
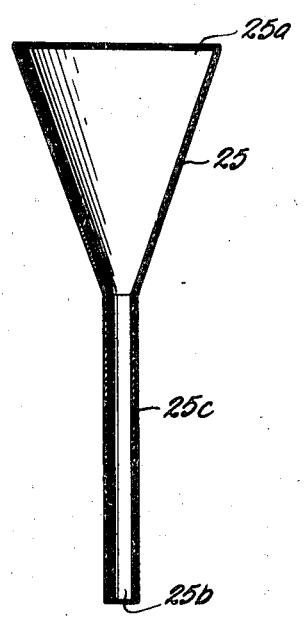
INVENTORS.
John S. Wallis
John W. Throckmorton
BY
ATTORNEY.

Patented Nov. 30, 1948

2,455,201

UNITED STATES PATENT OFFICE 2,455,201

FURNACE BAFFLE

John S. Wallis, Darien, and John W. Throckmorton, Wilton, Conn., assignors to Petro-Chem Process Company Incorporated, a corporation of Delaware Application January 3, 1944, Serial No. 516,754

2 Claims. (Cl. 110—97)

Our invention relates to improvements in a furnace structure and refers more particularly to a vertical furnace design in which a baffle is positioned between the source of combustion gases and the flue. The baffle is preferably conical or funnel shape with a hollow interior and having open ends at its top and bottom. The baffle is positioned in the upper portion of the combustion chamber diverting the heating gases outwardly thereby increasing the velocity of the gases and heat exchange in the upper sections of the heating tubes which surround the baffle on the interior surface of the combustion chamber.

By the use of a hollow baffle open at top and bottom combustion gases are recirculated downwardly through the interior of the baffle and combined with the furnace gases at the bottom or lower outlet of the baffle.

The advantage of a baffle of this character in a vertical furnace is to increase the rate of heat exchange on the upper portions of the tubes and in that section of the furnace where heating is dependent to a greater extent upon convection heat than below the baffle. The baffle also affords a reflecting surface for the radiant heat which improves heat exchange in the upper portion of the furnace. Forming an obstruction to the direct passage of furnace gases from the heating source in the bottom of the combustion chamber to the flue, the baffle is subjected to intense heat and recirculation of relatively cooler gases from top to bottom internally of the baffle affords a tempering effect which is advantageous to the furnace operation. Recirculation of a portion of the flue gases internally of the baffle eliminates a stagnant pocket of flue gas inside the baffle providing more uniform heating of the exchange elements within the furnace structure. Further objects and advantages will be revealed from the disclosure which follows.

In the accompanying drawings which form a part of the specification and are to be read in conjunction therewith, and in which like reference numerals are used to indicate like parts in the various views, Fig. 1 is a sectional view of a furnace showing a plain inverted conical shaped baffle having its lower open end slightly truncated;

Fig. 2 is a baffle of modified form in which the baffle cone is elongated;

Fig. 3 is a further modification in which the cone shaped baffle has an elongated open ended pipe formed at its lower end.

Referring to the drawings and more particularly to Fig. 1, in which there is shown a furnace design employing the invention, the furnace consists of a cylindrical shell 10 mounted upon suitable standards or supports 11. Within the shell is a layer of insulation 12 and a layer of refractory material 13 of suitable thickness to withstand temperatures within the combustion space and prevent excessive heat loss through the outer shell. The combustion chamber has a bottom 14 in which are mounted burners 15 capable of being adjusted to evenly distribute the combustion gases uniformly throughout the combustion space in order that tubes 16 arranged adjacent the inside surface of the combustion chamber are evenly heated. These vertical tubes or heat exchange units 16 arranged around the interior of the combustion chamber are connected by upper and lower return bends. Fluid to be heated is introduced to the tubes through an inlet pipe, not shown, and after traveling through the tubes is discharged through pipe 17. Cleanout plugs form a part of the return bends and offer means for cleaning the tubes when necessary. At the top of the furnace is a narrowed throat 18 of refractory material and the upper annular trough or enclosure surrounding the tubes diagrammatically shown at 19 is in sections removable when the tubes are to be withdrawn from the furnace for replacement or repair. To a circular monorail 20 surrounding stack 21 carried by supports 22 is hung tackle for withdrawing the tubes from the furnace. A balcony 23 surrounding the top of the furnace supports a platform for workmen when the top of the furnace is opened for repair.

Supported in the upper portion of the combustion chamber on hangers 24 is a cone shaped baffle 25 which has a top opening 25a and a bottom opening 25b.

The modified type of baffle shown in Fig. 2 is also designated by the number 25 and is similar in construction to that shown in Fig. 1, except that it is considerably greater in height. It has a similar top opening 25a and a bottom opening 25b. Likewise, the baffle shown in Fig. 3 has a conical portion 25, an upper open end 25a and a lower open end 25b.

In operation combustion gases produced by burning fuel in burners 15 pass upwardly through the combustion chamber and are distributed over tubes 16 to obtain an even distribution of heat throughout the chamber. This heat is transmitted from the combustion gases to the walls of the tubes and to the fluid being heated through the agencies of radiant and convection heat transfer. In the lower portion of the combustion chamber the tubes are subjected primarily to radiant heat, while the upper tube sections receive a greater amount of convection heat. The baffle 25 diverts the direction of flow of the combustion gases outwardly toward the tubes and with the wall of the chamber forms an annular passageway through which the gases must pass on their way to the flue. After passing the baffle the gases travel through the throat 18 in the top of the chamber and out through stack 21.

A portion of the flue gases are recycled back through the interior of the baffle passing from top to bottom in an opposed direction to the gases surrounding the baffle. The recirculated gas is discharged through the bottom opening 25b of the baffle and there joins the main body of combustion gases.

This recirculation through the baffle eliminates the possibility of a stagnant pocket of gas forming within the hollow baffle. It has a tempering or cooling effect upon the baffle as the gases entering at the top are at a lower temperature than the gases flowing upwardly around the exterior of the baffle.

Recirculation through the baffle is automatic requiring no additional fans, ducts or motors as it depends wholly upon an induced draft created by the difference in pressure upon the combustion chamber at the top and bottom of the baffle. By varying the length of the baffle as shown in the modified forms in Figs. 2 and 3, the rapidity or velocity of flow of the recirculating gases can be increased. This is due to the fact that increasing pressures exist from the bottom to the top of the chamber.

Typical of the conditions which may exist, where a flame burst temperature of 3000° F. is maintained in the heating of a particular fluid, a temperature of 1500° F. would be normal at the lower opening of the cone and a temperature of 1100° F. at the top of the cone. Draft conditions specified in inches of water under such temperature conditions would approximate .35 at the bottom of the chamber, .20 at the lower end of the cone and .05 at the top of the cone. Temperature and draft conditions in inches of water typical in a combustion chamber where the elongated type of cone shown in Figs. 2 and 3 are used would be 3000° F. for flame burst temperature, 1800° F. at the lower end of the cone and 1100° F. at the top of the cone, .35 for a draft condition at the bottom of the chamber, .275 at the lower end of the cone and .05 at the top of the cone.

Obviously the lower the baffle extends into the chamber the higher the draft and the greater the quantity of flue gas recirculated.

While the furnace has been shown circular in cross section, any shape furnace utilizing an upright combustion chamber in which an intermediate baffle is used is contemplated. Furthermore, the shape of the baffle may be varied to conform with the shape of the combustion chamber without departing from the concept of the invention. Temperature and draft conditions will depend upon the type of fluid being heated and instead of having a continuous pipe for circulating the fluid medium headers at top and bottom connected by heat exchange tube may be used in the furnace. In place of the burners used for producing the combustion gases, coal or other fuel may be employed according to the particular requirements circumstances.

In brief, the invention resides in the position of a baffle member within an upright combustion chamber having a hollow interior and open at top and bottom to create automatically recycling of the flue gas to increase the velocity of gases in the upper part of the chamber and obtain more uniform and efficient heating throughout.

From the foregoing it will be seen that the invention is well adapted to attain all of the ends and objects hereinbefore set forth, together with other advantages which are obvious and which are inherent to the structure.

Having thus described our invention, we claim:

1. A furnace having a vertically elongated combustion chamber, heat exchange units arranged about its interior wall, a source of combustion gases in the bottom thereof, a flue outlet at the top of the combustion chamber and a funnel shaped baffle with its large end uppermost centrally positioned within the upper portion of the combustion chamber immediately adjacent the flue to provide an annular passageway thereabouts, said baffle open at top and bottom permitting downward passage of gases through the interior of the baffle and upward passage of gases exterior of the baffle.

2. A furnace having a vertically elongated combustion chamber, heat exchange units arranged about its interior wall, a source of combustion gases in the bottom thereof, a flue outlet at the top, and a funnel-shaped baffle with its large end uppermost centrally positioned within the upper portion of the combustion chamber immediately adjacent the flue to provide an annular passageway thereabouts and having an elongated open-ended tubular appendage at the bottom of the baffle permitting downward passage of the gases through the interior of the baffle and upward passage of the gases exterior of the baffle.

JOHN S. WALLIS.
JOHN W. THROCKMORTON.

REFERENCES CITED

The following references are of record in the file of this patent:

UNITED STATES PATENTS

| Number | Name | Date |
|---|---|---|
| 41,152 | Hafer | Jan. 5, 1864 |
| 304,869 | Shealey | Sept. 9, 1884 |
| 978,467 | McArdle | Dec. 13, 1910 |
| 1,383,852 | Post | July 5, 1921 |
| 1,871,937 | Wilson | Aug. 16, 1932 |
| 1,885,674 | Beadle | Nov. 1, 1932 |
| 2,104,127 | Hickman | Jan. 4, 1938 |
| 2,177,573 | Kormendi | Oct. 24, 1939 |
| 2,195,617 | Clarkson | Apr. 2, 1940 |
| 2,286,688 | Roth | June 16, 1942 |